United States Patent [19]
Zehner

[11] Patent Number: 5,642,329
[45] Date of Patent: Jun. 24, 1997

[54] METHOD FOR DOUBLING THE RESOLVING POWER OF A SONAR ARRAY AND A SONAR ARRAY FOR IMPLEMENTING THE SAME

[75] Inventor: William J. Zehner, Lynn Haven, Fla.

[73] Assignee: The United States of America as represented by the Secretary of the Navy, Washington, D.C.

[21] Appl. No.: 538,484

[22] Filed: Oct. 3, 1995

[51] Int. Cl.$^6$ .................................................. G01S 15/00
[52] U.S. Cl. ........................................................... 367/105
[58] Field of Search ............................... 367/88, 103, 105, 367/7

[56] References Cited

U.S. PATENT DOCUMENTS

| | | | |
|---|---|---|---|
| 4,180,791 | 12/1979 | Tiemann | 367/105 |
| 4,596,007 | 6/1986 | Grall et al. | 367/105 |

*Primary Examiner*—Daniel T. Pihulic
*Attorney, Agent, or Firm*—Harvey A. Gilbert

[57] ABSTRACT

A sonar array which has a resolving power which is double that of conventional sonar arrays includes an array of hydrophones each having an acoustic center, a first projector positioned proximate a first endmost one of the hydrophones for launching a first sound signal during a first transmission time period, a second projector positioned proximate a second endmost one of the hydrophones for launching a second sound signal during a second transmission time period, wherein the hydrophones receive first echo signals and convert the first echo signals into first electrical echo signals during the first transmission time period, and receive second echo signals and convert the second echo signals into second electrical echo signals during the second transmission time period, and, a receiver for receiving and storing the first and second electrical echo signals, and for coherently summing the stored first and second electrical echo signals, to thereby produce a beam having a half-power beam width which is one-half that of a beam produced by a conventional sonar array. Also disclosed is a method for doubling the resolving power of a sonar array.

26 Claims, 2 Drawing Sheets

METHOD FOR DOUBLING THE RESOLVING POWER OF A SONAR ARRAY AND A SONAR ARRAY FOR IMPLEMENTING THE SAME

BACKGROUND OF THE INVENTION

The present invention relates generally to sonar arrays, and, more particularly, to a method for doubling the resolving power of a sonar array, e.g., a side-scanning or sector-scanning, pulsed-transmission, echo ranging sonar system, and a sonar array which implements this method.

In general, a sonar array consists of an arrangement of appropriately spaced-apart sonar transducers or projectors which convert electrical energy generated by a sonar transmitter into sound waves which are launched by the projectors into surrounding water. The sound waves, which collectively constitute an acoustic beam, travel through an area of surrounding water subtended by the beam to detect and locate objects, such as mines and submarines, which may be present in this area of the water. These objects are known as sonar targets. By appropriately controlling the phase and amplitude of the electrical signals applied to the individual sonar projectors, using a beam forming and steering network, a plurality of beams having different shapes and profiles can be formed and steered, to thereby scan a desired coverage area. The area of the water and/or sea floor that is acoustically imaged in the course of a sonar scan is sometimes referred to as the "ensonification field". The sonar targets located in the ensonification field, reflect or scatter the beam, to thereby produce return or echo sound signals (or simply, "echo") which are converted into appropriate electrical signals by an array of appropriately spaced-apart transducers or hydrophones. The electrical signals produced by the hydrophones are then fed to a sonar receiver. These electrical signals, which are representative of the echo, are then processed by receiver electronics and displayed in intelligible form for use by sonar personnel in identifying and/or locating the sonar target(s). Of course, the transmitter and receiver can be embodied as an integrated transmitter/receiver (transceiver) which can be switched between transmit and receive modes of operation.

To facilitate a better understanding of the ensuing description of the present invention, certain fundamentals of array theory will now be briefly reviewed. More particularly, with reference now to FIG. 1, there can be seen a linear or line array 20 which includes a plurality, $N_e$, of hydrophone elements 22 whose acoustic centers are periodically spaced at intervals d along the x-axis. This line array 20 can be used to steer a plurality of beams relative to the array broadside. The general point-reflector response function for any line array, subject only to the restriction that the field point is sufficiently far from the array that the spherical amplitude spreading term is negligibly different across the array, can be written as:

$$P(R_0, \theta) = \sum_{i=1}^{N_e} W_i e^{j(\omega t - kRri - kRt)} \quad (1)$$

where $R_o$ is the distance from the first array element to the field point, $\theta$ is the relative bearing angle to the field point, $W_i$ are the complex beam forming coefficients applied to the hydrophone array (e.g., to effect amplitude shading, beam steering, beam focusing, and calibration), $\omega$ is the frequency of the beam, in radians, t is time, k is $2\pi/\lambda$ (where $\lambda$ is the wavelength of the beam), Rt is the distance from the projector 24 to the field point, and Rri are the distances from the field point to the $i^{th}$ array element at the time of echo reception. If the distance from the field point to the array is large compared to both the wavelength and the array length, then the distance traveled by the wave front from the field point to the $i^{th}$ element differs from the distance to the first element by:

$$\delta = d(i-1)\sin\theta. \quad (2)$$

In that case, Equation (1) can be written as:

$$P(R_0, \theta) = \sum_{i=1}^{N_e} W_i e^{j(\omega t - k(d(i-1)\sin\theta + R_0) - kRt)} \quad (3)$$

Several terms can be moved outside of the summation and ignored since they contribute only a constant phase shift, to thereby yield the following equation:

$$P(R_0, \theta) = e^{j(\omega t - kR_0 - kRt)} \sum_{i=1}^{N_e} W_i e^{-jkd(i-1)\sin\theta} \quad (4)$$

An expression for the resolution of an unshaded, unfocused, unsteered array can be derived by selecting $W_i = 1/N_e$, and neglecting the time dependence, whereby equation (4) can be further simplified to:

$$P(\theta) = 1/N_e \sum_{i=1}^{N_e} e^{-jkd(i-1)\sin\theta} \quad (5)$$

This finite series is recognized as a geometrical progression, the sum of which is contained in the bracketed term below:

$$P(\theta) = 1/N_e[(e^{-jkdN_e\sin\theta} - 1)/(e^{-jkd\sin\theta} - 1)] \quad (6)$$

Using Euler's formulae, the magnitude of the pressure field can be expressed as:

$$P(\theta) = \sin((N_e \pi d/\lambda)\sin\theta)/N_e \sin((\pi d/\lambda)\sin\theta), \quad (7)$$

which is referred to as the "array factor". The radiation pattern of an individual array element of length D (i.e., the "element directivity pattern") is:

$$P_E(\theta) = \sin((\pi D/\lambda)\sin\theta)/((\pi D/\lambda)\sin\theta) \quad (8)$$

In accordance with the well-known "product theorem", the net array directivity pattern is the product of the array factor and the element directivity pattern. In the special case of a filled array, in which d=D, the result is the following well-known sine (x) pattern of an unshaded line array:

$$P_E(\theta) = \sin((N_e \pi d/\lambda)\sin\theta)/((\pi d/\lambda)\sin\theta). \quad (9)$$

Inspection of equation (10) reveals that the first null in the pattern occurs at an angle given by:

$$\theta_{pn} = \sin^{-1}(\lambda/N_e d), \quad (10)$$

where $\theta_{pn}$ is the peak-to-null beam width. Further, the half-power beam width, which is usually considered to constitute the resolution limit in the Rayleigh sense, is given by:

$$\theta_{-3dB} = 0.88\theta_{pn} = 0.88\sin^{-1}(\lambda/L), \quad (11)$$

where L is the total array length, which equals $N_e d$. Otherwise stated, equation (11) represents the fundamental, diffraction-limited, azimuthal resolution limit (i.e., maximum resolving power) of a conventional sonar array.

For a more detailed treatment of the above and other aspects of array and electroacoustics theory, reference may be made to the textbook Antenna Theory (Part 1), R. E. Collins, (McGraw-Hill, New York, 1969), pp. 146–147, the textbook Antenna Theory and Practice, R. Chatterjee, (John Wiley & Sons, New York, 1988), pp. 86–87, and the textbook Theory of Electroacoustics, J. Merhaut, (McGraw-Hill, New York, 1981), pp. 172–173.

Because the physical length of the array (i.e., the available aperture space) is almost always limited by system considerations, many efforts have been made in the past to develop techniques for maximizing the resolving power of the array within those physical constraints. In this connection, several techniques have been heretofore developed in order to enhance the effective resolution of conventional sonar arrays having a given physical array length, including monopulse transmission, maximum entropy, and maximum likelihood signal processing. However, the effectiveness of all of these "super-resolution" techniques is dependent upon and limited by (i.e., is a function of) the signal-to-noise (S/N) ratio of the system.

Based on the above, it can be appreciated that there presently exists a need in the art for a method for improving the resolution of a sonar array which can be used in lieu of or in addition to presently available resolution enhancement techniques, and whose effectiveness is not a function of the S/N ratio of the system. The present invention fulfills this need.

SUMMARY OF THE INVENTION

The present invention encompasses a sonar array which has a resolving power which is double that of conventional sonar arrays, and which includes an array of hydrophones each having an acoustic center, a first projector positioned proximate a first endmost one of the hydrophones for launching a first sound signal during a first transmission time period, a second projector positioned proximate a second endmost one of the hydrophones for launching a second sound signal during a second transmission time period, wherein the hydrophones receive first echo signals and convert the first echo signals into first electrical echo signals during the first transmission time period, and receive second echo signals and convert the second echo signals into second electrical echo signals during the second transmission time period, and, a receiver for receiving and storing the first and second electrical echo signals, and for coherently summing the stored first and second electrical echo signals, to thereby produce a beam having a half-power beam width which is one-half that of a beam produced by a conventional sonar array. The acoustic centers of the hydrophones are preferably equally spaced-apart relative to a first axis (e.g., the x-axis) by a constant element spacing interval. Further, each of the hydrophones preferably has a length equal to the constant element spacing interval. It is also preferable that none of the hydrophones be acoustically shadowed by any other portion of the array. Additionally, it is preferable that the first and second sound signals be identical, i.e., that the weighting function applied to the hydrophones be the same for both the first and second transmission.

In a preferred embodiment of the present invention, the first and second projectors are positioned in juxtaposition to the first and second endmost ones of the hydrophones, respectively. In a first alternative embodiment of the present invention, the first and second projectors are coincident with the first and second endmost hydrophones, respectively. The first and second projectors also preferably serve as the first and second projectors, respectively, in this first alternative embodiment. In a second alternative embodiment of the present invention, the first hydrophone is coincident with the first endmost hydrophone, and the second hydrophone is positioned a distance from an acoustic center of the second endmost hydrophone equal to the constant element spacing interval. The first hydrophone preferably also serves as the first projector in this second alternative embodiment.

The present invention also encompasses a method which includes the steps of launching a first signal from a first position proximate a first end of the array during a first transmission time period, launching a second signal from a second position proximate a second end of the array during a second transmission time period, receiving first echo signals and converting the first echo signals into first digital echo signals during the first transmission time period, receiving second echo signals and converting the second echo signals into second digital echo signals during the second transmission time period, storing the first and second digital echo signals, and, coherently summing the stored first and second digital echo signals.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE INVENTION

Figure 1:
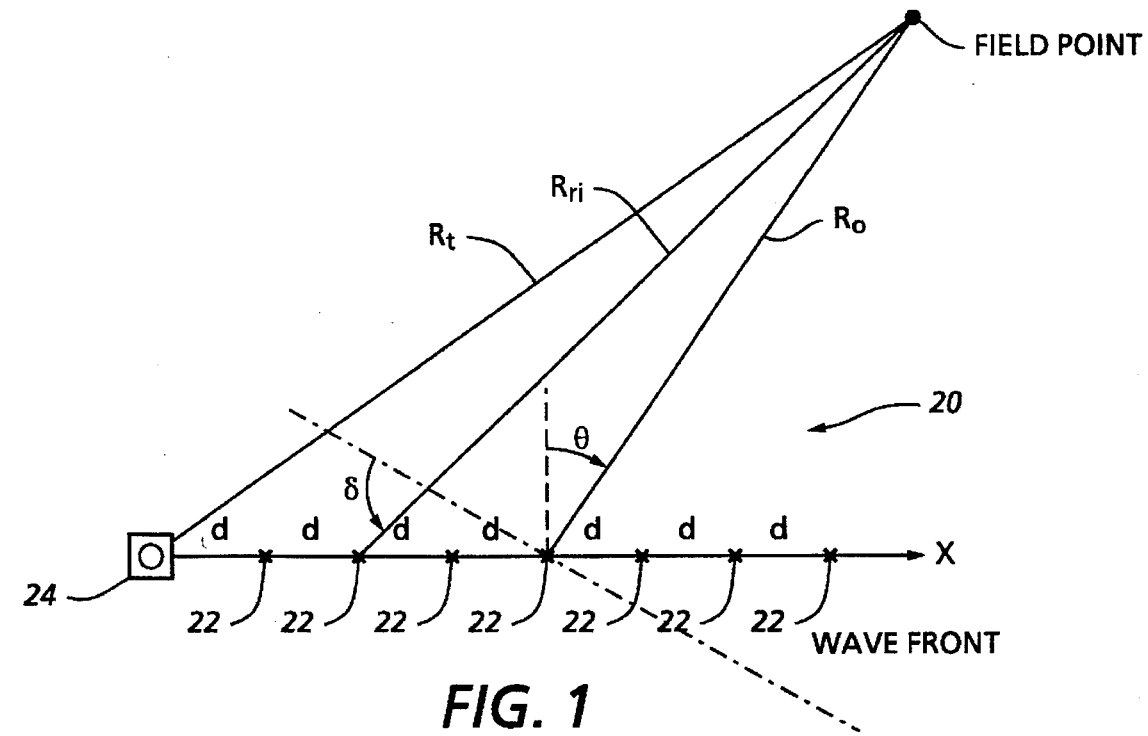
FIG. 1 is a diagrammatical representation of a conventional sonar array.

In overview, the present invention uses two separate transmissions to form a beam, using first and second projectors positioned at or near opposite ends of a sonar array, and then coherently sums the echo signals received by the array from both transmissions, to thereby effectively double the resolving power of the array (i.e., halve the beam width/angular resolution of the aperture). In this connection, the general point-target relative response function for any virtual line array using $N_t$ transmissions and $N_e$ physical hydrophone elements to produce a beam can be expressed as:

$$P(R_0, \theta) = \sum_{j=1}^{N_t} \sum_{i=1}^{N_e} W_{i,j} e^{j(\omega t - k(Rt_{i,j} + Rt_j))}, \qquad (12)$$

where $W_{ij}$ are the complex beam forming coefficients (i.e., weighting function) applied to the hydrophone array to effect beam steering, focusing, and side lobe suppression, in the normal manner, $Rt_j$ is the distance from the projector location at the time of the $j^{th}$ transmission to the field point, and $Rr_{ij}$ is the distance from the field point to the $i^{th}$ array element at the time of echo reception from the $j^{th}$ transmission.

Preferably, the array includes a plurality $N_e$ of hydrophone elements equally spaced-apart from one another by an interval d. In this case, the geometry of the array can be described by the following equation:

$$Rt_2 = Rt_1 + N_e d \sin\theta, \qquad (13)$$

where $Rt_2$ is the distance from the projector location at the time of the second transmission to the field point, $\theta$ is the relative bearing angle to the field point, and $Rt_1$ is the distance from the projector location at the time of the first transmission to the field point.

Preferably, the same weighting function $W_{ij}$ is applied to the hydrophone elements for both transmissions, i.e., $W_{i1} = W_{i2}$. In this case, the coherent summation of the echo signals received by the array from both transmissions, from Equation (12), can be reduced to:

$$P(R,\theta) = \qquad (14)$$

$$e^{j\omega t}e^{-jkR_0}e^{-jkRt_1}\left[\sum_{i=1}^{N_e} W_i e^{-jkd(i-1)\sin\theta} + \sum_{i=1}^{N_e} W_i e^{-jk(d(i-1)\sin\theta + dN_e\sin\theta)}\right],$$

which is identical to:

$$P(R,\theta) = e^{j\omega t}e^{-j2kR_0}e^{-jkRt_1}\sum_{i=1}^{2N_e} W_i e^{-jkd(i-1)\sin\theta}. \qquad (15)$$

From the above, it will be appreciated that the summation of the echo signals over $2N_e$ rather than just $N_e$ is identical to the result that would be obtained by using a single transmission with a conventional array twice as long. Thus, the angular resolution of the array having a two-transmission aperture in accordance with the present invention is:

$$\theta_{-3dB} = 0.88\sin^{-1}(\lambda/(2L)), \qquad (16)$$

which is one-half that of a conventional array having a single-transmission aperture. Otherwise stated, an array constructed in accordance with the present invention has twice the resolving power of a conventional array of equal length.

Figure 2:
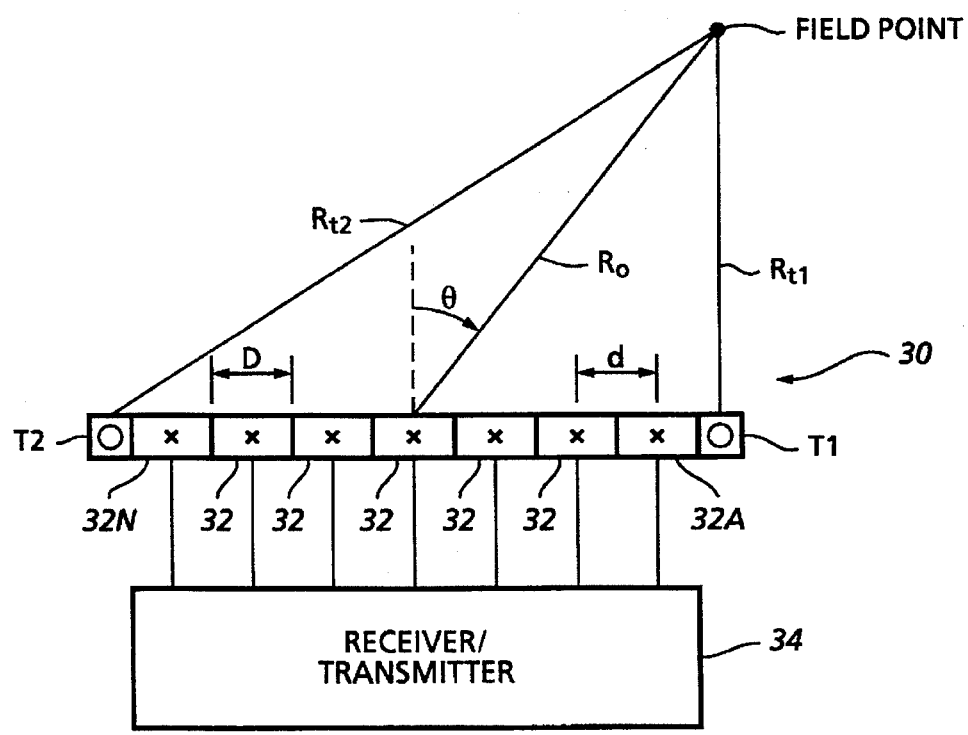
FIG. 2 is a diagrammatical representation of a sonar array constructed in accordance with the preferred embodiment of the present invention.

With reference now to FIG. 2, there can be seen a sonar array 30 constructed in accordance with a presently preferred embodiment of the present invention. The sonar array 30 is a segmented line array which includes a plurality $N_e$ of hydrophone elements 32 whose acoustic centers are preferably equally spaced-apart by a constant element spacing interval d. Each of the hydrophone elements 32 preferably has a length D equal to the constant element spacing interval d, a first projector T1 located in juxtaposition to a first endmost hydrophone element 32A, and a second projector T2 located in juxtaposition to a second endmost hydrophone element 32N opposite the first endmost hydrophone element 32A. The hydrophone elements 32 are commonly coupled to a transmitter/receiver 34, which preferably includes an A/D converter (not shown) and a read/write memory (not shown), e.g., a random access memory (RAM).

In operation, a first sound signal is launched by the first projector T1 at a first time t1, and a second sound signal is launched by the second projector T2 at a second time t2, to thereby provide a two-transmission aperture. The echo signals from the first sound signal are received by the hydrophone elements 32, and converted into electrical echo signals, which are then fed to the transmitter/receiver 34, in the normal manner. However, in accordance with the present invention, rather than processing the electrical echo signals to produce a beam, in the conventional manner, the transmitter/receiver 34 stores or records the electrical echo signals corresponding to the first sound signal, e.g., by using the A/D converter to digitize the electrical echo signals and then storing the digitized echo signals in the RAM. Then, after all of the signals from the first transmission are recorded, the echo signals from the second sound signal are received and recorded in the same manner as the echo signals corresponding to the first sound signal. Preferably, as discussed previously, the second sound signal is identical to the first sound signal, i.e., the same weighting coefficients $W_i$ are applied to the hydrophone elements 32 for both the first and second transmissions. Then, after all of the signals from the second transmission are recorded, the transmitter/receiver 34 coherently sums the recorded signals corresponding to the first and second transmissions, to thereby produce a beam having half the half-power beam width as that produced by a conventional array of the same length as the array of the present invention, i.e., the array of the present invention has twice the resolving power of a conventional array of the same length. In this regard, the beam produced by the array 30 constructed in accordance with the preferred embodiment of the present invention has a half-power beam width defined by equation (16) above.

In accordance with a first alternative embodiment of the present invention, the first and second projectors T1 and T2 are coincident with, rather than juxtaposed to, the first and second endmost hydrophone elements 32A and 32N, respectively. With the first alternative embodiment, the total length L of the array is the same as with the preferred embodiment, and the first and second endmost hydrophone elements 32A and 32N can be used for both transmission and reception, thereby eliminating the need for separate projectors, i.e., the first and second endmost hydrophone elements 32A and 32N also serve as the first and second projectors T1 and T2, respectively. However, the first alternative embodiment requires that the weighting or shading function have a zero value on the right end of the second transmission (i.e., $W_{Ne,2}=0$), which slightly degrades the resolution of the array relative to the preferred embodiment depicted in FIG. 2. In this connection, the beam produced by the array constructed in accordance with the first alternative embodiment of the present invention has a half-power beam width defined by the following equation (17):

$$\theta_{-3dB} = 0.88\sin^{-1}(\lambda/(2(N_e-1)L)). \qquad (17)$$

In accordance with a second alternative embodiment of the present invention, the first projector T1 is coincident with, rather than juxtaposed to, the first endmost hydrophone element 32A, and the second projector T2 is centered a distance exactly equal to d to the left of the acoustic center of the second endmost hydrophone element 32N. The beam produced by an array constructed in accordance with the second alternative embodiment of the present invention has a half-power beam width defined by equation (16) above. Thus, the results achieved with the second alternative embodiment of the present invention are identical to those achieved with the preferred embodiment of the present invention. Further, the first endmost hydrophone element 32A can also serve as the first projector T1, thereby eliminating the need for a separate first projector. However, an array constructed in accordance with the second alternative embodiment requires a total array length (i.e., a total aperture space) greater than that of the array of the preferred embodiment by the distance d.

Figure 3:
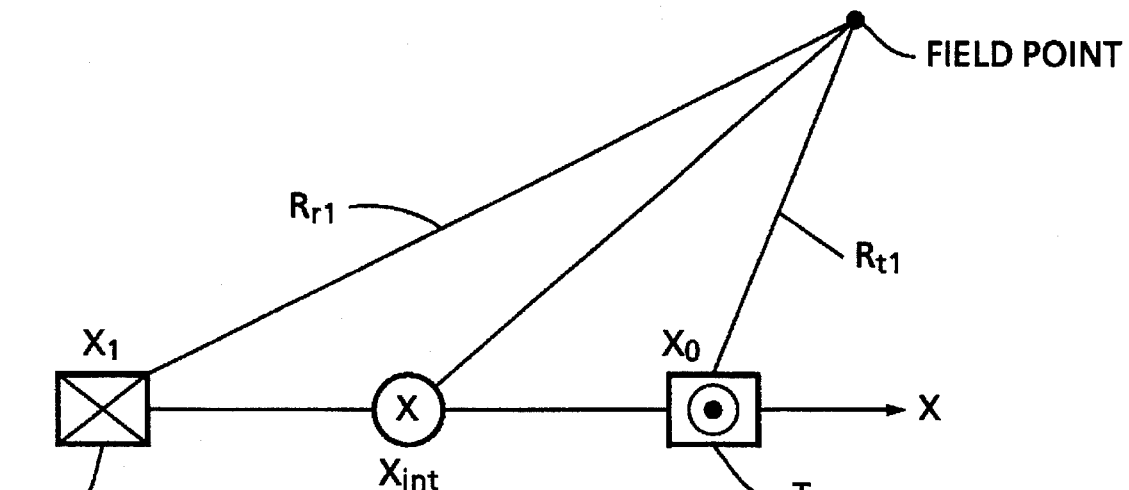
FIG. 3 is a diagram which illustrates the effective transmit/receive position intermediate a hydrophone element and a projector; and, FIG. 4 is a diagrammatical representation depicting the effective transmit/receive positions of the sonar array of the preferred embodiment of the present invention (i.e., the sonar array depicted in FIG. 2) for both first and second transmissions.
Figure 4:
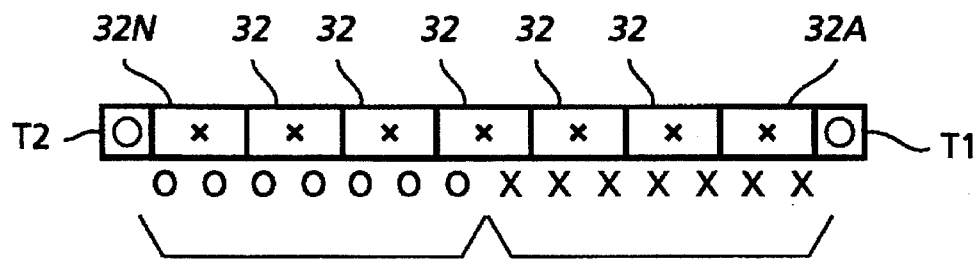

In order to facilitate an enhanced understanding of the present invention, the basic prinicples thereof will now be described in non-mathematical terms, using a simplifying concept, known as "effective transmit-receive (T/R) positions", in the vernacular of synthetic aperture sonar technology. More particularly, with reference now to FIG. 3, if a transducer element T (e.g., a hydrophone or projector) positioned at location $x_0$ launches a sound signal received by a hydrophone H positioned at location $x_1$, the path travelled by the sound waves is, to first order, the same as that which would have been travelled by sound waves launched and received at a location $x_{int}$, halfway between $x_0$ and $x_1$. The location $x_{int}$ is known as an effective T/R position. By extension, as depicted in FIG. 4, the first transmission from the array 30 of the preferred embodiment described above and depicted in FIG. 2, results in $N_e$ effective T/R positions, designated by xs in FIG. 4, and the second transmission results in an additional $N_e$ effective T/R positions, designated by Os in FIG. 4. Taken together, these $2N_e$ effective T/R positions result in a synthetic array having twice the resolving power of a conventional array of the same length. Otherwise stated, a synthetic array of length L has the same resolution as a real array of length 2L, as a result of the two-way transmission path. For a more detailed treatment of this subject of effective T/R positions, and synthetic aperture sonar, reference may be made to U.S. Pat. No. 4,244,036, issued to R. S. Raven.

Figure 5:
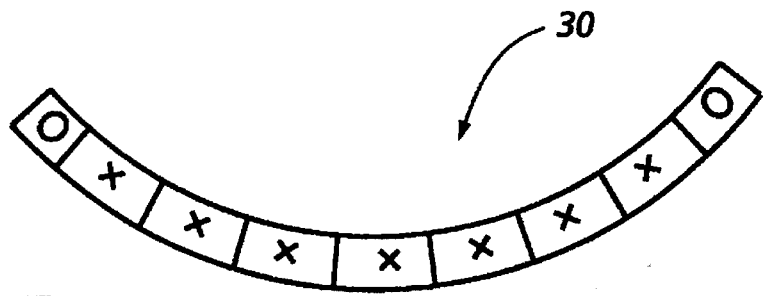
FIG. 5 is a diagrammatic representation of a circular or cylindrical array.

As will be readily appreciated by those skilled in the art, there are many other alternative embodiments of the present invention which can be easily implemented by those skilled in the art to which this invention pertains. Of course, the specific implementation of the present invention will vary depending upon the particular frequencies and resolutions of interest to the user, i.e., upon the particular application of the array. In this connection, it will be readily evident to those skilled in the pertinent art that an array constructed in accordance with the present invention can be of any arbitrary shape or configuration, e.g., linear or circular, as seen in FIG. 5 provided that the x-y locations of the acoustic centers of the hydrophone elements thereof are known or are ascertainable. In this regard, any y-axis displacements of the acoustic centers of the hydrophone elements can be offset or eliminated by imparting appropriate phase shifts and/or time delays to the received echo signals, in the usual, well-known manner. Otherwise stated, it will be readily appreciated by those skilled in the pertinent art that any sonar array configuration which results in a periodic set of effective T/R positions, preferably a plurality of equally spaced-apart T/R positions, and which uses the two-transmission technique of the present invention to form a beam, will satisfy the above-stated criteria for the implementation of the present invention, and will provide an angular resolution which satisfies equation (17) if the ($N_e$-1) term in equation (17) is appropriately replaced to reflect the chosen configuration. The only restrictions on the array shape are that the x-axis positions of the hydrophone elements be periodic (or nearly periodic), with the hydrophone elements being preferably equally spaced-apart with respect to the x-axis (or, for cylindrical arrays as seen in FIG. 5, that the hydrophone elements have a constant angular spacing), and that the hydrophone elements be exposed to the ensonification field, i.e., not be acoustically shadowed by some other segment of the array. These restrictions are the same as those for a conventional array. However, it should be clearly understood that the present invention, in its broadest sense, can be practiced without these restrictions, albeit with a trade-off in array performance.

Although various embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims. For example, although the present invention has been described in terms of a method for doubling the resolving power of a sonar array and a sonar array implementing the same, it should be clearly understood that the present invention is also applicable to radar arrays, ultrasonic imaging devices such as are utilized in the field of medical diagnostics. Further, although those skilled in the art will recognize that the present invention has particular utility with respect to sector-scanning sonar or radar arrays that operate either unfocused in the far field (i.e., in the Fraunhofer region) or electronically focused in the near field (i.e., in the Fresnel diffraction region), those skilled in the art will also appreciate that the present invention has broad applicability to any class and/or type of sonar, radar, ultrasonic imaging, or other apparatus which employ an array of radiating elements and a receiver or similar device for processing return signals from an object(s) scanned by the radiating elements in order to provide intelligible information regarding such object(s).

What is claimed is:

1. A sonar array for doubling resolving power, comprising:

an array of hydrophones, each of said hydrophones having an acoustic center, said array of hydrophones including opposite first and second endmost hydrophones;

a first projector positioned proximate said first endmost hydrophone for launching a first sound signal during a first transmission time period;

said hydrophones for receiving first echo signals from an object in response to said first projector launching said first sound signal and for converting said first echo signals into first electrical echo signals during said first transmission time period;

a receiver for receiving said first electrical echo signals from said hydrophones and for storing said first electrical echo signals;

a second projector positioned proximate said second endmost hydrophone for launching a second sound signal during a second transmission time period following after compnetion of said first transmission time period;

said hydrophones also for receiving second echo signals from the object in response to said second projector launching said second sound signal and for converting said second echo signals into second electrical echo signals during said second transmission time period; and said receiver also for receiving said second electrical echo signals from said hydrophones and for storing said second electrical echo signals;

said receiver further for coherently summing said stored first and second electrical echo signals in order to thereby provide information regarding the object.

2. The sonar array as set forth in claim 1, wherein said first projector is coincident with said first endmost hydrophone.

3. The sonar array as set forth in claim 2, wherein said second projector is coincident with said second endmost hydrophone.

4. The sonar array as set forth in claim 1, wherein said acoustic centers of said hydrophones are equally spaced-apart relative to a first axis by a constant element spacing interval.

5. The sonar array as set forth in claim 2, wherein said acoustic centers of said hydrophones are equally spaced-apart relative to a first axis by a constant element spacing interval.

6. The sonar array as set forth in claim 5, wherein said second projector is positioned a distance from said acoustic center of said second endmost hydrophone equal to said constant element spacing interval.

7. The sonar array as set forth in claim 2, wherein said first endmost hydrophone serves as said first projector.

8. The sonar array as set forth in claim 3, wherein said second endmost hydrophone serves as said second projector.

9. A sonar array, comprising:

an array of hydrophones each having an acoustic center, said acoustic centers of said hydrophones being equally spaced-apart relative to a first axis by a constant element spacing interval, each of said hydrophones having a length equal to said constant element spacing interval;

a first projector positioned proximate a first endmost one of said hydrophones for launching a first sound signal during a first transmission time period;

a second projector positioned proximate a second endmost one of said hydrophones for launching a second sound signal during a second transmission time period;

wherein said hydrophones receive first echo signals and convert said first echo signals into first electrical echo signals during said first transmission time period, and receive second echo signals and convert said second echo signals into second electrical echo signals during said second transmission time period; and a receiver for receiving and storing said first and second electrical echo signals, and for coherently summing said stored first and second electrical echo signals, to thereby produce a beam.

10. The sonar array as set forth in claim 1, wherein said array is a linear array.

11. The sonar array as set forth in claim 1, wherein said array is a cylindrical array, and said acoustic centers of said hydrophones are equally spaced-apart by a constant angular spacing interval.

12. A sonar array, comprising:

a cylindrical array of hydrophones each having an acoustic center, said acoustic centers of said hydrophones being equally spaced-apart relative to a first axis by a constant element spacing interval, said cylindrical array of hydrophones including a first endmost hydrophone and a second endmost hydrophone, said first and second endmost hydrophones being positioned opposite each other;

a first projector positioned proximate said first endmost hydrophone for launching a first sound signal during a first transmission time period;

a second projector positioned proximate said second endmost hydrophone for launching a second sound signal during a second transmission time period;

wherein said hydrophones receive first echo signals and convert said first echo signals into first electrical echo signals during said first transmission time period, and receive second echo signals and convert said second echo signals into second electrical echo signals during said second transmission time period; and a receiver for receiving and storing said first and second electrical echo signals, and for coherently summing said stored first and second electrical echo signals, to thereby produce a beam.

13. The sonar array as set forth in claim 1, wherein none of said hydrophones are acoustically shadowed by any other portion of said array.

14. The sonar array as set forth in claim 1, wherein said array is configured in such a manner as to provide a plurality of transmit/receive positions which are equally spaced-apart relative to a first axis.

15. The sonar array as set forth in claim 1, wherein said first and second sound signals are identical.

16. A method for doubling the resolving power of an array of spaced-apart transducers, comprising the steps of:

launching a first signal from a first position proximate a first end of said array during a first transmission time period;

launching a second signal from a second position proximate a second end of said array during a second transmission time period following after completion of said first transmission time period;

receiving first echo signals from an object in response to said launching of said first signal and converting said first echo signals into first digital echo signals during said first transmission time period;

storing said first digital echo signals;

receiving second echo signals from the object in response to said launching of said second signal and converting said second echo signals into second digital echo signals during said second transmission time period;

storing said second digital echo signals; and coherently summing said stored first and second digital echo signals in order to thereby provide information regarding the object.

17. The method as set forth in claim 16, wherein:

said transducers are equally spaced-apart relative to a first axis by a constant element spacing interval; and, wherein said first position is coincident with said first end of said array.

18. The method as set forth in claim 17, wherein said second position is coincident with said second end of said array.

19. The method as set forth in claim 17, wherein said second position is spaced-apart from said second end of said array by a distance equal to said constant element spacing interval.

20. An apparatus for doubling the resolving power of an array of spaced-apart transducers, said apparatus comprising:

an array of spaced-apart transducers including opposite first and second endmost transducers;

a first radiating element positioned proximate said first endmost transducer for radiating a first signal during a first transmission time period;

a receiver for receiving first return signals from an object in response to said first radiating element radiating said first signal and for converting said first return signals into first digital return signals during said first transmission time period;

a second radiating element positioned proximate said second endmost transducer for radiating a second signal during a second transmission time period following after completion of said first transmission time period; and said receiver for receiving second return signals from the object in response to said second radiating element radiating said second signal and for converting said second return signals into second digital return signals during said second transmission time period;

said receiver also for summing said first and second digital return signals in order to thereby provide information regarding the object.

21. A method for doubling the resolving power of a sonar array, comprising the steps of:

providing a sonar array of hydrophones, each of said hydrophones having an acoustic center, said sonar array of hydrophones including opposite first and second endmost hydrophones;

providing a first projector positioned proximate said first endmost hydrophone for launching a first sound signal during a first transmission time period;

providing a second projector positioned proximate said second endmost hydrophone for launching a second sound signal during a second transmission time period following after completion of said first transmission time period;

providing a receiver connected to said array of hydrophones;

receiving at said hydrophones first echo signals of a body in response to launching of said first sound signal during said first transmission time period;

converting said first echo signals into first electrical echo signals during the first transmission time period;

receiving and storing at said receiver said first electrical echo signals;

receiving at said hydrophones second echo signals of the body in response to launching of said second sound signal during said second transmission time period;

converting said second echo signals into second electrical echo signals during said second transmission time period;

receiving and storing at the receiver said second electrical echo signals; and coherently summing said stored first and second electrical echo signals in order to thereby provide information regarding the object.

22. The method as set forth in claim 21, wherein said providing said first projector includes providing said first projector coincident with said first endmost one of said hydrophones.

23. The method as set forth in claim 21, wherein said providing said second projector includes providing said second projector coincident with said second endmost one of said hydrophones.

24. The method as set forth in claim 21, further comprising:

providing said array as a linear array.

25. The method as set forth in claim 21, further comprising: providing said array as a cylindrical array.

26. A method for doubling the resolving power of an array of spaced-apart transducers, comprising the steps of:

providing an array of spaced-apart transducers including opposite first and second endmost transducers;

positioning a first radiating element proximate said first endmost transducer;

radiating from said first radiating element a first signal during a first transmission time period;

providing a receiver;

receiving at said receiver first return signals from an object in response to said radiating of said first signal;

converting said first return signals into first digital return signals during said first transmission time period;

positioning a second radiating element proximate said second endmost transducer;

radiating from said second radiating element a second signal during a second transmission time period following after completion of said first transmission time period;

receiving at said receiver second return signals from the object in response to said radiating said second signal;

converting said second return signals into second digital return signals during said second transmission time period; and summing said first and second digital return signals in order to thereby provide information regarding the object.

* * * * *